United States Patent [19]

Kawawa

[11] 3,837,226
[45] Sept. 24, 1974

[54] SIGHT GLASS ASSEMBLY AND A METHOD OF PRODUCING THE SAME

[75] Inventor: Eiji Kawawa, Tokyo, Japan

[73] Assignee: Nihon Klingage Co., Ltd., Tokyo, Japan

[22] Filed: Dec. 22, 1971

[21] Appl. No.: 210,721

[30] Foreign Application Priority Data
Dec. 29, 1970  Japan.............................. 45-128168

[52] U.S. Cl...................... 73/331, 73/334, 161/45, 220/82 A
[51] Int. Cl. .......................................... G01f 23/02
[58] Field of Search ................ 161/45, 192; 220/82; 49/171; 109/58.5; 73/323, 325, 330, 334

[56] References Cited
UNITED STATES PATENTS

| | | | |
|---|---|---|---|
| 1,701,987 | 2/1929 | Sawyer.................................. | 49/171 |
| 1,737,291 | 11/1929 | Bauer.................................... | 49/171 |
| 2,491,758 | 12/1949 | Nichols et al......................... | 88/1 |
| 3,014,981 | 12/1961 | Appl ..................................... | 174/152 |
| 3,438,539 | 4/1969 | LeRoy .................................. | 220/46 |
| 3,533,287 | 10/1970 | Kruschik............................... | 73/331 |
| 3,578,407 | 5/1971 | Arnold et al.......................... | 23/252 |
| 3,625,390 | 12/1971 | Meginnis.............................. | 220/46 R |

Primary Examiner—George F. Lesmes
Assistant Examiner—William R. Dixon, Jr.
Attorney, Agent, or Firm—Cushman, Darby & Cushman

[57] ABSTRACT

A sight glass assembly for use with a peep hole of a pressure vessel, comprising a glass plate and a reinforcing metal ring, said ring framing said plate in a manner of tightly enclosing said plate over a substantially cylindrical boundary surface between said plate and said ring and presenting an end face substantially flush with a surface of said plate, wherein said cylindrical boundary surface is tapered adjacent and toward said end face to present a base angle of substantially 45° so that the stress-concentration expected to occur in the glass plate due to the hoop tension applied thereto by said ring will be relieved in said tapered boundary surface of said glass plate and said ring.

5 Claims, 13 Drawing Figures

PATENTED SEP 24 1974　3,837,226

INVENTOR.
Eiji Kawawa
BY
Cushman, Darby + Cushman
Attorneys

SIGHT GLASS ASSEMBLY AND A METHOD OF PRODUCING THE SAME

BACKGROUND OF THE INVENTION

1. Field of the Invention

This invention relates to a sight glass assembly for use with a peep hole of a pressure vessel and a method of producing the same.

2. Description of the Prior Art

Conventionally, the sight glass of a peep hole of a pressure vessel is mostly composed of a piece of glass plate which is clamped to a frame of the peep hole with interposition of a packing sheet, as shown, for example, in FIG. 1 which is a longitudinal section of a peep hole structure equipped with conventional sight glass plates, wherein 1 designates such sight glass plates that are clamped to a peep hole frame 2 with interposition of packing sheets 3 by means of clamping bolts 4 which apply clamping force to the glass plates 1 via clamping frames 5 and clamping washers 6.

However, in case of high pressure vessel, wherein the clamping force applied to the glass plate is correspondingly increased, the glass plate is subject to a high compression and/or bending stress, and therefore, there is a drawback that the glass plate is often broken by over-stressing.

It may be proposed as a measure to prevent the breakage of the glass plate to reinforce the glass plate by a metal ring adapted to frame or surround the glass plate, so that the glass plate is mounted onto a peep hole by the metal ring being clamped to a frame of the peep hole. However, since a metal usually has very different physical properties as compared with a glass, a very difficult problem is encountered with respect to the metal reinforced glass plate as explained in detail below.

There is the possibility of two methods of binding a metal ring to a glass plate to provide a metal reinforced glass plate assembly. One is to use a binding agent or adhesive and the other is to effect a physical binding by using stress-binding which uses to advantage the difference in thermal expansion coefficient of the metal and the glass. With respect to the first method, it is said that this method is actually unsuitable, because the binding agents presently known are much inferior to glass in their durability against water and chemicals as well as in their fluid-tightness.

Therefore, the second method must be relied upon to produce a metal reinforced glass plate assembly. However, as already described above, the physical properties of glass and metal are very different from each other, and therefore, when a glass plate and a metal ring are bound together by thermal pre-stressing to provide a sufficiently fluid-tight metal-glass assembly at operating temperature, the glass will be over-stressed at a non-operating lower temperature condition, whereby there often occurs cracking in the glass plate, and in some cases, the cracking proceeds so far as to cause exfoliation of a part of the glass plate.

FIGS. 2 to 5 show an example of the above-mentioned cracking and of exfoliation caused in a glass plate clamped by a metal ring. In these figures, 7 designates a glass plate having a cylindrical peripheral surface in binding contact with a metal ring 8. When the glass plate 7 is over-stressed in radial directions by the hoop tension applied by the ring 8 due to differences in thermal expansion coefficients of the glass and metal, there can occur cracks 9 in a conical surface having base angle of about 45°. When the cracks proceed due to further and/or repeated over-stressing, there can occur an exfoliation as shown by 10 in FIGS. 3 and 5.

SUMMARY OF THE INVENTION

Accordingly, it is the main object of this invention to provide an improved sight glass assembly of a glass plate and a reinforcing metal ring, wherein the above-mentioned difficulty due to cracks or exfoliations is overcome.

This object is accomplished, according to the present invention, by a sight glass assembly for use with a peep hole of a pressure vessel, comprising a glass plate and a metal ring, said ring framing said plate in a manner thereby tightly enclosing said plate over a substantially cylindrical boundary surface between said plate and said ring and presenting an end face substantially flush with a first surface of said plate, characterized in that said cylindrical boundary surface of the metal ring is tapered adjacent and toward said end face to present base angle of substantially 45°.

Another object of this invention is to provide a method of producing the sight glass assembly as described above.

BRIEF DESCRIPTION OF THE DRAWING

In the accompanying drawing.

Thus FIGS. 1–5 (sheet 1) relate to prior procedures and FIGS. 6–13 (sheet 2) illustrate various embodiments of the present invention.

DESCRIPTION OF THE PREFERRED EMBODIMENTS

In the following discussion, this invention will be described more particularly of some preferred embodiments with reference to the accompanying drawings.

Figure 1:
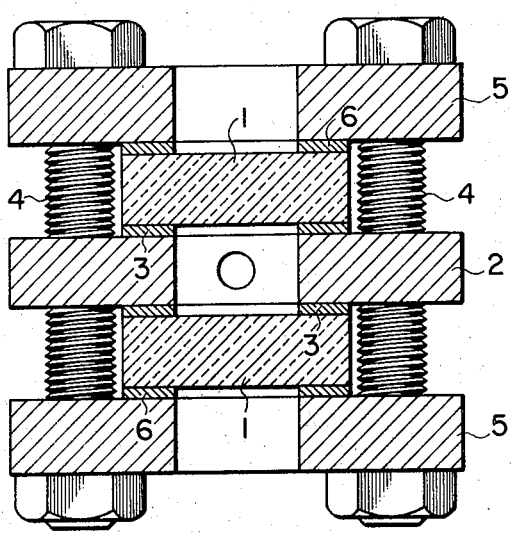
FIG. 1 is a longitudinal cross section of a peep hole structure equipped with conventional sight glass plates.
Figure 2:
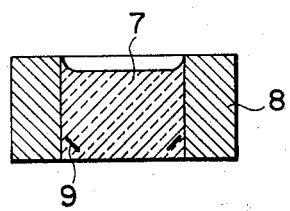
FIGS. 2 and 3 are longitudinal cross sections of sight glass assemblies which are not illustrating the present invention and are subject to cracking and exfoliation.
Figure 3:
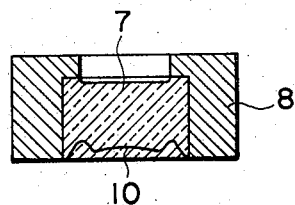
Figure 4:
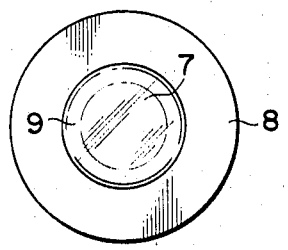
FIGS. 4 and 5 are views of the sight glass assemblies taken from below is shown in FIGS. 2 and 3, respectively.
Figure 5:
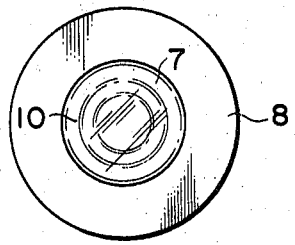
Figure 6:
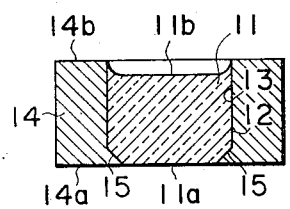
FIGS. 6, 7 and 8 are longitudinal cross sections of various embodiments of the sight glass assembly according to this invention.

FIG. 6 shows a first embodiment of the sight glass assembly according to this invention, wherein a glass plate 11 has a cylindrical peripheral surface 12 over which the glass plate is in binding contact with a corresponding cylindrical surface 13 of a metal ring 14. The glass plate 11 and the metal ring 14 define a plane surface wherein surface 11a and an end face 14a are arranged in flush relationship. Adjacent and toward the surface 11a and the end face 14a, the cylindrical surfaces 12 and 13 of the glass plate and the metal ring, respectively, are tapered as shown by reference numeral 15 to a base angle of substantially 45°. The other surface of the glass plate 11, indicated by 11b, is slightly set in from the other end face 14b of the metal ring 14 thereby protecting the surface 11b from being damaged by careless contact with foreign materials, and furthermore, this arrangement is desirable from the manufacturing standpoint as will be appreciated from the following description with respect to the method of production.

Since the glass plate 11 and the metal ring 14 are formed to define a boundary surface therebetween in conformity with the surface in which the cracking of the glass plate would normally occur, the stress concentration which would otherwise be effected in the glass plate and cause the cracking is thereby relieved in the boundary surface. Thus, the sight glass assembly according to this invention is perfectly free from the danger of cracking or exfoliation.

Figure 7:
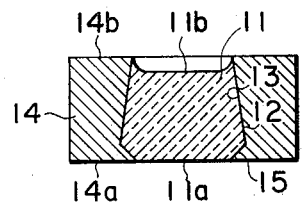
Figure 8:
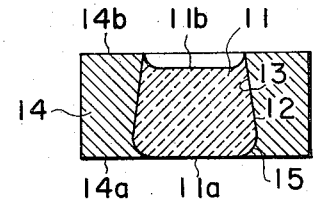

FIGS. 7 and 8 show other embodiments of the sight glass assembly according to this invention wherein the portions corresponding to those in FIG. 6 are designated by like reference numerals.

In the embodiment shown in FIG. 7, the surfaces 12 and 13 are formed to have a slightly tapered conical surface. In this case an advantage is obtained in that the glass plate 11 is more firmly bound within the metal ring 14 and there is no danger that the glass plate 11 will be forced out of the metal ring 14 due to pressure applied to the surface 11a of the glass plate.

In the embodiment shown in FIG. 8, the tapered portion 15 is formed of a spherical or other similar smooth surface communicated to the principal conical portion of the surfaces 12 and 13, and this results in the advantage that no stress concentration occurs at the intersection portion where the tapered portion 15 joins the principal portion of the surfaces 12 and 13.

Figure 9:
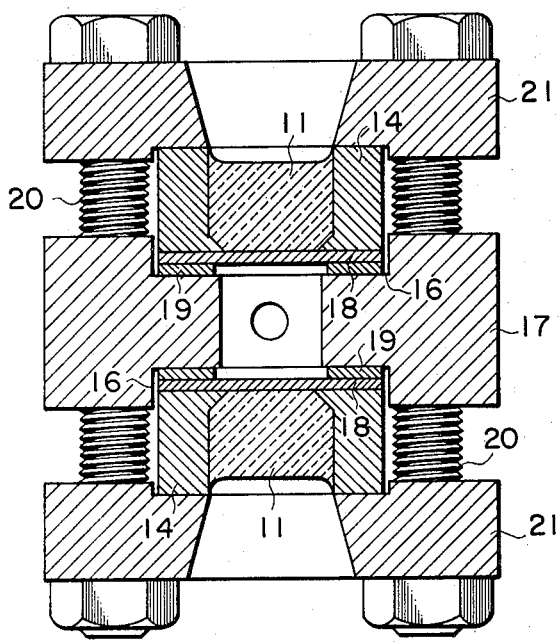
FIG. 9 is a longitudinal cross section of a peep hole structure employing the sight glass assemblies according to this invention.
Figure 10:
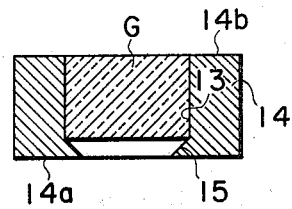
FIGS. 10 to 13 show an embodiment of the method of manufacturing the sight glass assembly according to this invention.

FIG. 9 shows an example of a peep hole structure employing the sight glass assemblies shown in FIG. 6. In this example, the sight glass assemblies are mounted in grooves 16 formed in a peep hole frame 17 with the interposition of mica plates 18 and packing sheets 19. The mica plates 18 are provided to protect the glass plates 11 from being damaged by the fluid contained in the vessel, such as alkaline substances, high temperature steam or other vapors, and the like. The sight glass assemblies are clamped by bolts 20 via clamping frames 21 which engage only the metal rings 14.

FIGS. 10 to 13 show the method of producing the sight glass assembly as shown in FIG. 6.

Figure 11:
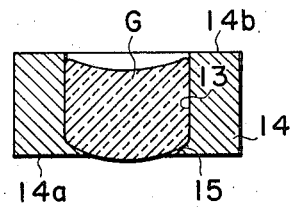
Figure 12:
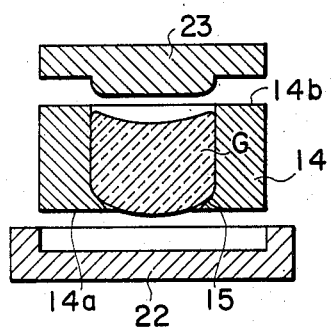
Figure 13:
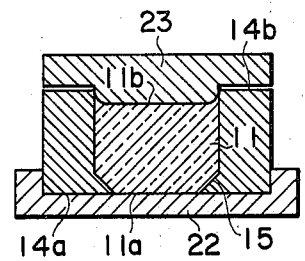

In the beginning, a glass body G of cylindrical shape having length substantially equal to the length of the cylindrical portion of the inner surface 13 of the metal ring 14 is inserted into the ring 14. Then, the ring 14 with the glass body G is placed in a heating furnace and heated up to a temperature above the softening temperature of the glass. As the heating proceeds and the glass body G softens, the glass body adheres to the inside surface of the ring 14 and takes a somewhat suspended shape such as shown in FIG. 11. At a proper time before the glass body G begins to flow, the ring 14 with the glass body G is taken out of the heating furnace and placed on a table 22 so that the lower end face 14a contacts the table 22. Then, a press form 23 is applied to the upper surface of the glass body G and a compression force is exerted to the glass body G confined in the space defined by the ring 14, the table 22 and the press form 23 so that the glass body G follows the shape of the defined space and is formed into glass plate 11 (FIGS. 12 and 13). Thus, the sight glass assembly as shown in FIG. 6 is obtained, wherein the assembly has a plane surface defined by the end face 14a of the ring 14 and the glass surface 11a formed by the table 22 to be flush with the face 14a.

I claim:

1. An improved sight glass assembly for use as a peep hole in association with a pressure vessel, said assembly including a substantially cylindrical glass plate and a substantially cylindrical metal ring tightly surrounding, framing and having the same contour as said glass plate, said metal ring in a sealing relationship to said glass plate, said metal ring and said glass plate presenting a substantially planar surface to said pressure vessel, said glass plate and said metal ring having a interposing boundary surface adjacent the end of said assembly directly adjacent to said pressure vessel, said interposing boundary convergently tapered adjacent and toward said planar surface and said pressure vessel to present a base angle of the order of about 45°, said assembly being devoid of binding agents between said glass plate and said metal ring, said glass plate being retained under pressure conditions within said metal ring by the circumferential pressure exerted by said metal ring wherein the glass plate surface opposite said 45° taper surface is recessed from the corresponding surface of said metal ring.

2. The sight glass assembly according to claim 1 wherein the substantially cylindrical boundary surface is slightly convergently tapered over the entire length thereof away from the direction of said base angle and toward the end of said assembly opposite said pressure vessel, thereby more firmly retaining said glass plate in said metal ring to resist pressure applied in the direction of the slight convergent taper.

3. The sight glass assembly according to claim 2 wherein said base taper of about 45° and said slight taper in the opposite direction intersect in a substantially smooth and rounded surface.

4. An improved sight glass assembly for use as a viewing hole in high pressure applications comprising a substantially cylindrical glass plate having two planar ends, one end spaced longitudinally of the other, one of said ends being tapered to a base angle of the order of about 45° and adapted to contact the pressure side of a high pressure vessel;

a substantially cylindrical metal ring having an inside configuration corresponding to the outside configuration of said glass plate, said metal ring tightly surrounding and framing said glass plate in a sealing relationship therewith;

said glass plate within said metal ring forming an assembly having a high pressure side and a low pressure side;

said taper of said glass plate and the corresponding taper of said metal ring converging towards said high pressure side of said assembly wherein the glass plate surface opposite said 45° taper surface is recessed from the corresponding surface of said metal ring.

5. The improved sight glass assembly of claim 4 further including a second taper extending from said first taper and converging in a direction towards the low pressure side of said assembly, said second taper in said glass plate and a corresponding taper in the inside configuration of said metal ring, the assembly being devoid of additional sealing means.

* * * * *